United States Patent

[11] 3,568,169

[72] Inventor Victor T. Shahan
Wappingers Falls, N.Y.

[21] Appl. No. 652,496
[22] Filed July 11, 1967
[45] Patented Mar. 2, 1971
[73] Assignee International Business Machines Corporation
Armonk, N.Y.

[54] DUPLEX CYCLE FOR 2-D FILM MEMORIES
6 Claims, 3 Drawing Figs.

[52] U.S. Cl. .......... 340/174
[51] Int. Cl. .......... G11c 7/00, G11c 11/14
[50] Field of Search .......... 340/174 (M), 174 (TF)

[56] References Cited

UNITED STATES PATENTS 3,283,313 11/1966 Hathaway .......... 340/174
3,414,890 12/1968 Schwartz .......... 340/174

*Primary Examiner*—James W. Moffitt
*Attorneys*—Hanifin and Jancin and William S. Robertson

ABSTRACT: Magnetic memory having timing means to perform simultaneous operations on two words of the memory. In one embodiment the sequence is read A, clear B, write B, regenerate A. In a second embodiment the sequence is clear B, read A, write B, regenerate A.

INVENTOR
VICTOR T. SHAHAN

BY W S Robertson

ATTORNEY

DUPLEX CYCLE FOR 2-D FILM MEMORIES

BACKGROUND

A magnetic thin film storage device for a data processing system illustrates an important use for the apparatus of this invention. Such a memory has thin magnetic film elements that are magnetized in either of two directions to represent one and zero of information. The operation of magnetizing the elements for storage is called a write operation. The operation of sensing the values stored in an element is called read.

In the memory that will be described in detail later, there are two wires coupled to each element, one called a word wire and the other called a bit-sense wire. These wires are arranged in a matrix with a storage element at each of the intersecting points of the matrix. Thus for each storage element there is a unique combination of 1-word wire and 1-bit wire. All of the elements on a word wire form a group called a word. Each element on a bit-sense wire represents a particular bit position within its associated word.

In a read operation the addressed word wire is energized sufficiently to change the magnetization enough to give an indication of their previous magnetization. The voltage produced by this flux change appears on the associated bit-sense wire. A sense amplifier is connected to the bit-sense wire; it distinguishes between voltages that signify a zero and voltages that signify a one, and it produces an output voltage that is suitable for use elsewhere.

In a write operation each element within the addressed word is individually magnetized by circuits on both the bit wire and the word wire according to the data that is to be stored. The bit current level is low enough that switching occurs only where the word wire is energized.

Because all the bit-sense wires are used for both the read operation and the write operation, it has not been possible (with exceptions described in the next section) to operate on more than one word at a time. An object of this invention is to provide a new and improved memory that can perform two different kinds of read-write operations simultaneously. These operations are called clear-write and read-regenerate. In a clear-write operation, the word line is first energized to destroy the existing information; the word wire and bit wires are then energized to write the new data. In a read operation the word wire is also energized at a level that destroys the previous information; a regenerate operation restores the original information. Thus read and clear are generally alike and regenerate and write are generally alike.

These two operations occur in sequence often enough that the memory of this invention is effectively much faster than a memory that has the same read-write cycle time but performs only a single operation during each cycle. The following introduction to the prior art efforts to operate a memory at an effective speed that is faster than the read-write cycle time will help to show the significance of the objects of this invention.

THE PRIOR ART

The prior art has suggested several memories that modify the standard matrix in order to provide simultaneous or overlapping operation. By contrast, an important object of this invention is to provide an improved memory that retains the standard matrix arrangement.

The prior art has suggested using the standard matrix arrangement with more bits on a word line so that for certain kinds of operations the effect is the same as reading several words in one operating cycle. The prior art has also suggested interleaving several independent memories so that for some operation the apparatus using the memory can operate first one memory and then another in a sequence that is faster than the speed of a single memory. The prior art has also suggested memories in which the apparatus using the memory sometimes interrupts the read-write cycle for related operations outside the memory; these memories have been arranged to go ahead with an operation on a second word during this break in the read-write cycle of the first word.

Thus the general goal of providing a memory that is effectively faster than its read-write cycle time has been long recognized and such memories have important use in data processing systems.

SUMMARY OF THE INVENTION

Some thin film memories can be operated fast enough that a significant part of the operating cycle is associated with the process of transmitting the signal from the input of a sense amplifier to the output of the associated bit driver for the forthcoming regenerate operation. This delay is long enough, or can be extended slightly to be long enough, for a clear-write operation to be performed during the delay. In one embodiment of the invention the memory operates on two words A and B in the sequence read A, clear B, write B, regenerate A. In a second embodiment the memory operates in the sequence clear B, read A, write B, regenerate A. The second embodiment may be preferable where the delay for regeneration is shorter than the clear-write cycle time.

The foregoing and other objects, features and advantages of the invention will be apparent from the following more particular description of preferred embodiments of the invention, as illustrated in the accompanying drawings.

THE PREFERRED EMBODIMENT

Figure 1:
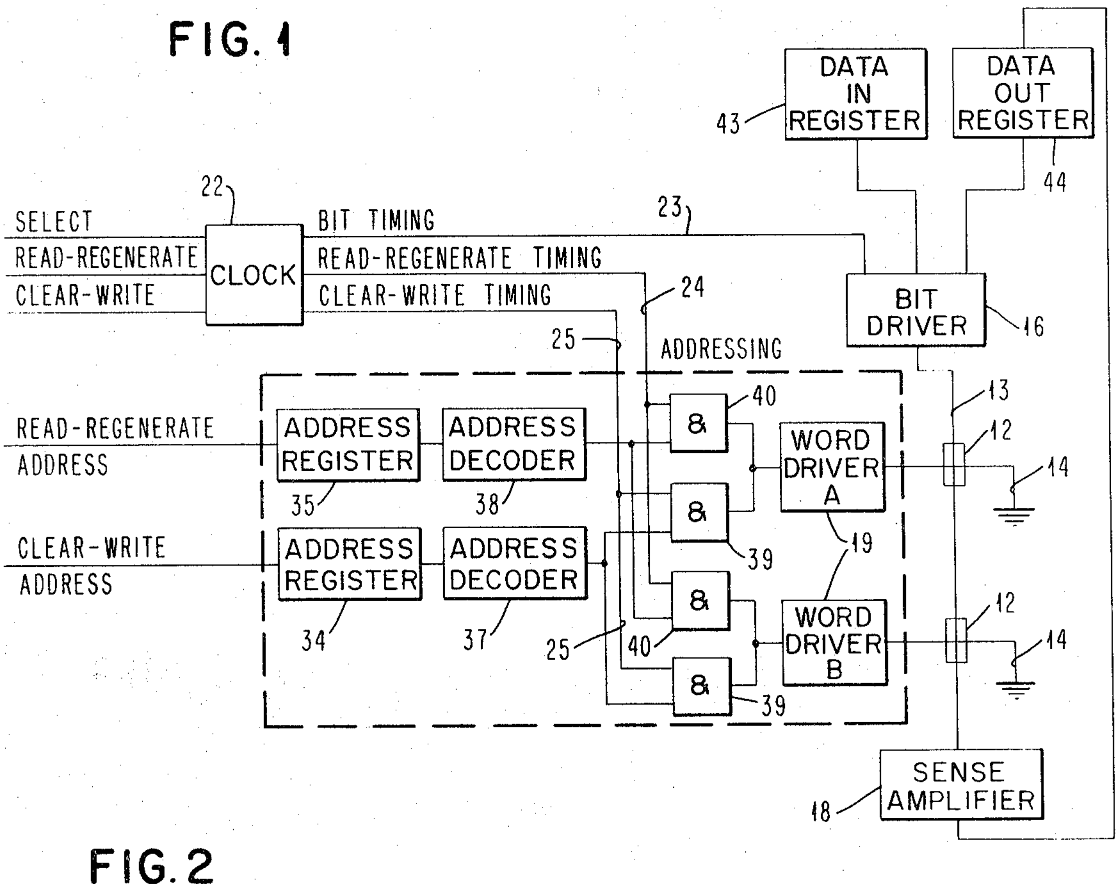
FIG. 1 shows a memory of the general type that has been described and additional circuitry to provide the operation sequence of this invention.

The memory has magnetic thin film elements 12 arranged in rows and columns. The elements of each column are coupled to a bit-sense wire 13 (or equivalently separate bit and sense wires) and the elements of each row are coupled to a word wire 14. Each bit-sense wire is coupled to be energized by a bit driver 16 and is coupled to a sense amplifier 18 that receives the signal produced when an element 12 is switched during a read operation. Each word wire is coupled to be energized by a word driver 19. The two word drivers illustrate simultaneous operation on two words of the memory and the single bit driver and sense amplifier illustrate the operation of a memory of any selected number of bits per word.

The thin film storage elements have orthogonal hard and easy axes of magnetization. The easy axis is used for storage and is aligned in the direction of flux produced by current in the bit wires. The film is switched into a hard axis direction during both read and clear and the films have the hard axis aligned in the direction of flux produced by current in the word wires. For a read or clear operation, the addressed word line is preferably energized with a current to saturate the film in the hard axis direction. For a write or regenerate operation, each bit wire is energized in a polarity that corresponds to the data that is to be stored in the corresponding bit position. The word current is removed ahead of the bit current and the magnetism of each element of the word is thereby switched to the selected direction along the easy axis.

A clock 22 provides timing signals for the drivers and other components of the memory. It provides timing pulses on a line 23 to control the bit drivers through both the read regenerate and the clear-write operations (since each bit driver operates during both write and regenerate). It produces timing signals on a line 24 to control the addressed word driver for a read-regenerate operation, and it produces signals on a line 25 to control the addressed word driver through a clear-write operation. The clock may include a tapped delay line and a driver. Unless the memory is already busy, the driver responds to a select pulse at one input to start a pulse down the line. The taps are connected to produce pulses on output lines 23, 24, and 25. The clock also receives an input that signifies that a read-regenerate operation is to take place and an input that signifies that a clear-write operation is to take place.

The clock includes gates that control the transmission of pulses to the outputs in response to the signals at its inputs. The construction of such gates in clocks is well known.

The system using the memory provides addresses and an indication of whether the operation at an address is to be a clear-write operation or a read-regenerate operation. As the drawing illustrates the invention, a register 34 is provided that stores only clear-write addresses and a register 35 is provided that stores only read-regenerate addresses. Associated address decoders 37 and 38 respond to the contents of the registers to enable the addressed word driver to turn on in response to timing signals on line 24 or line 25. For each word driver there is an AND gate 39 that connects the driver input to receive a clear-write address from decoder 37 and clear-write timing signals on line 25. A similar AND gate 40 connects each word driver to receive a read-regenerate address from decoder 38 and timing signals on line 24. The illustrated wired connection of the two AND gates at each driver input forms an OR logic function. Thus any one of the drivers can be turned on in response to read-regenerate timing signals and any other driver can be turned on in response to clear-write timing signals. In the examples of the operation shown in FIGS. 2 and 3, word driver A is operated according to read-regenerate timing and word driver B is operated according to clear-write timing.

The components just described illustrate a function that can be provided by appropriate modification of a variety of known circuits that provide addressing for a single word in each operation. The fact that these functions can be performed by various relationships between components is indicated by the dashed line enclosing the components in the drawing.

The two registers and two decoders of FIG. 1 help to illustrate the function of operating on two words. A single register may be arranged to handle both addresses in sequence. One function of the two registers of FIG. 1 is to maintain the address signals at the driver inputs throughout the operating cycle. With a single register, this function is transferred to other components; for example, the drivers can be monostable to produce a predetermined width pulse in response to a much shorter pulse from the address register.

A Data In register 43 is arranged to receive data that is to be written in the memory at the address held by register 34. Data that has been read from the word identified by address register 35 is stored in a Data Out register 44. The output of the Data Out register is available to the system using the memory. At appropriate times established by timing signal on line 23, the bit drivers are turned on according to data in one of these registers.

Figure 2:
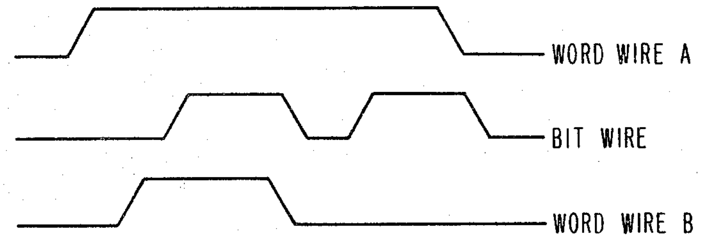
FIG. 2 shows the bit current and word current wave forms of one embodiment of this invention.

In the operation of the memory that FIG. 2 illustrates, the operating cycle begins with a word current on the word line of driver A. This current has an appropriate amplitude to switch the film for read. The signal from a storage element 12 appears at the sense amplifier input and is applied to data register 44 for the forthcoming regenerate operation.

Shortly after word driver A is turned on, word driver B is turned on. Sufficient delay is provided to prevent the B word current from interfering with the read operation on word A. The sense amplifier is conventionally controlled to not respond to the corresponding signals on the bit lines. The current from word driver B switches the film elements into the hard axis direction in preparation for the forthcoming write operation.

The bit drives are then turned on in response to data in register 43. As has already been explained the word driver B is turned off slightly ahead of the time the bit drivers are turned off to write the data in word B. The output of the bit driver can be a positive pulse as FIG. 2 shows or a negative pulse.

The bit drivers are then turned on in response to data in register 44. The bit drivers and word driver A are then turned off to regenerate the data in word A.

Figure 3:
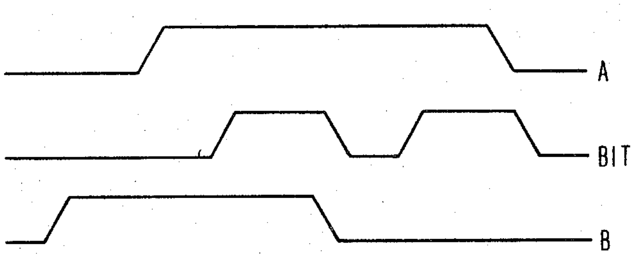
FIG. 3 shows the bit current and word current wave forms of a second embodiment of this invention.

The operation illustrated by FIG. 3 is generally similar to the operation just described except that the operation proceeds in the sequence clear B, read A, write B, regenerate A.

The memory also responds to the clock inputs to perform either a read-regenerate or a clear-write operation separately. The operation of FIG. 3 provides the advantage that both operations start very close to the select pulse at the input of clock 22. With the operation of FIG. 2, the clock can be constructed to begin a clear-write operation in response to a select pulse when there is no simultaneous read-regenerate operation.

Several modifications of the addressing and timing circuits have already been suggested. The invention is particularly useful with thin film memories because of their speed, because the word currents are of only one polarity, and because these memories typically have 2-D organization. In 2-D organization each word can be given a current at a level suitable for read without significantly exciting the storage elements of other words. In the examples of FIGS. 2 and 3 the word drivers A and B are operated simultaneously and do not switch elements outside the two words. This invention is useful in 2-D memories and variants of 2-D organization that provide this feature. The invention is also useful with other types of storage elements such as ferrite cores.

While the invention has been particularly shown and described with reference to preferred embodiments thereof, it will be understood by those skilled in the art that the foregoing and other changes in form and details may be made therein without departing from the spirit and scope of the invention.

I claim:

1. In a memory having:

a plurality of storage elements;

word means coupled to said elements and individual to groups of elements forming a word and individually operable to excite the elements of an addressed word;

bit means coupled to said elements and individual to elements of the same bit position in said words and operable to excite the elements of an addressed word in cooperation with said word means to store data and operable to detect signals produced when the elements of an addressed word are switched in a read operation;

the improvement comprising:

means for providing during a memory cycle a memory address of a first word to be addressed for a clear-write operation and a second word to be addressed for a read-regenerate operation;

means to overlappingly operate said word means of said first addressed word for a clear operation and said second addressed word for a read operation, the beginning of the operation on said words being separated in time sufficiently for sensing changes in magnetization of the storage elements of the one of said words being read;

means to read said one of said addressed words and operable to regenerate said one word in the memory after a delay that is associated principally with said means to read and to regenerate; and means operable during said delay to energize said bit means in cooperation with said word means of the other of said addressed words to write predetermined data into the location of said other of said words.

2. A memory according to claim 1 in which the word means of said first word is operated ahead of the word means of said sensed word.

3. A memory according to claim 1 in which said bit means and said means responsive to the data stored in said one of said words comprises, for each bit position, a bit driver, a sense amplifier, wire means coupling said bit driver and said sense amplifier to the storage elements of the associated bit position, and register means for receiving data representing a signal from said sense amplifier and providing said signal to said bit driver for said bit driver to regenerate said one word.

4. A memory according to claim 1 in which said means operable during said delay to energize said bit means includes a Data In register.

5. A memory according to claim 4 in which said word means produces for either a clear-write operation or a read-regenerate operation a single pulse of one polarity.

6. In a memory having:

a plurality of thin film storage elements;

word means coupled to said elements and individual to groups of elements forming a word and operable to drive said elements into saturation in a hard axis direction for read-regenerate and clear-write operations;

bit means coupled to said elements and individual to elements of the same bit position in said words and operable in cooperation with said word means to store data along the easy axis of said elements during regenerate and write operations and operable to detect signals produced when the elements of an addressed word are switched in a read operation;

the improvement comprising:

means to overlappingly operate said word means of a first and a second addressed word in a time succession spaced sufficiently for a read operation on one of said words independently of a clear operation on the other of said words;

means responsive to data read from said one of said addressed words and operable after a delay associated principally with said means to detect signals to energize said bit means and to turn off said word means of said one of said addressed words to regenerate said one word in the memory; and means operable during said delay to energize said bit means and to turn off said word means of the other of said addressed words to write predetermined data into the other of said words.